UNITED STATES PATENT OFFICE.

ULYSSES A. GARRED, OF ELMHURST, NEW YORK.

PROCESS OF TREATING SLAGS.

1,319,061.     Specification of Letters Patent.     Patented Oct. 21, 1919.

No Drawing.     Application filed June 6, 1919. Serial No. 302,155.

*To all whom it may concern:*

Be it known that I, ULYSSES A. GARRED, a citizen of the United States, residing at Elmhurst, in the county of Queens and State of New York, have invented certain new and useful Improvements in Processes of Treating Slags, of which the following is a specification.

As well understood in the art, slag from the iron blast furnace is frequently employed as an ingredient in the manufacture of cement, being as a rule free from iron, or containing it in such negligible quantities as not to make the same objectionable. On the other hand, slag from copper-smelting furnaces, that is to say, furnaces in which the roasted ore is smelted for purposes of making matte, contains a large percentage of iron in the form of ferrous oxid in combination with silica (silicate of iron) which makes the slag objectionable and entirely unsuitable for the manufacture of cement. Thousands of tons of this slag go to waste every year because unavailable for any commercial or industrial purpose. The object of my invention is to remove the objectionable iron (and other bases) from such slag, thereby producing a slag that is comparatively pure, and free from discoloring bases, at the same time recovering the iron for independent use. The advantages of my invention will be fully apparent from a detailed description thereof which is as follows:

The slag is tapped from the smelting furnace and run into a suitable crucible, slag-pot, converter, or equivalent treatment vessel in which the operations under my process may be carried on. The charge of slag in the treatment vessel should be maintained in a highly heated and fluid condition, this being accomplished by burning within the mass a proper complement of carbonaceous fuel, preferably powdered coal, introduced into the bath by a current or jet of air or other supporter of combustion blown into the body of the charge at a point below the surface thereof. This is best accomplished by providing the vessel with suitable jet nozzles or twyers discharging through the bottom of the vessel directly into the bath, said nozzles or twyers being connected by pipes with any suitable source of air supply, proper provision being made for mixing the powdered fuel with the air before the latter reaches the jet nozzles or twyers aforesaid. Such expedients are common in the metallurgical art and an illustration thereof is herein unnecessary. A certain portion of the fuel complement is thus burned within the body of the charge, thereby maintaining the bath in a highly fluid condition and preventing the same from becoming viscous. The powdered fuel should be introduced in quantities sufficient to not only keep the bath in fluid condition but to reduce the iron oxid combined with the silica of the slag; and in practice this excess carbon may preferably be introduced in the later stages of the process, or what may be termed the second stage after the desired fluidity and temperature has been attained by the introduction of the first portions of the fuel. The bath having reached the desired temperature, the blast with its fuel complement is continued, a suitable quantity of lime preferably in powdered or granular form being added. The lime, though preferably blown into the bath with the powdered coal may be charged into the vessel independently, the object sought being to cause the coal as well as the lime to thoroughly permeate and become diffused throughout the bath. The diffused carbon operates to reduce the iron of the slag, the lime replacing the iron thus reduced. In other words, there is produced a lime slag or a silicate of calcium, and iron in the metallic state. The iron drops to the bottom and may be conveniently removed while the slag is still liquid, by pouring off the slag. When we consider that these copper slags often contain all the way from 30 to 45 per cent. of iron which goes to waste, the desirability of recovering this iron by some simple process at once becomes apparent. By blowing a charge of copper slag in conjunction with a sufficient quantity of carbonaceous fuel to keep the slag in a highly fluid state and then continuing the blowing operation with carbon in excess to reduce the iron, in the presence of a fluxing material such as lime (carbonate or oxid) or its equivalent, to furnish a suitable base for the silica originally combined with the iron (the lime having a greater affinity for silica than has iron and hence replacing the latter under proper conditions), I not only recover in practically one operation the iron, but at the same time produce a slag (calcium silicate) suitable for the manufacture of cement. There must be of course a sufficient amount of carbonaceous fuel or coal present at all times to maintain the bath in a fluid condition, the excess carbon being depended upon to act as the reducing agent for the iron; and while I have mentioned lime as the fluxing agent, it is to be understood that so far as the invention is concerned any equivalent fluxing material may be substituted for the lime, as for example magnesia or a mixture of the carbonates of magnesium and calcium. If the object sought be the mere recovery of the iron then any suitable fluxing material might be employed. If the primary object be the production of a slag suitable for the manufacture of cement, then lime is the preferred fluxing agent since a lime slag is best suited for that purpose.

It is apparent from the foregoing that the quantities of the reagents added to the bath of molten slag undergoing treatment will vary with the charge operated on. The skilled metallurgist will be governed by conditions. The quantity of excess fuel added for purposes of reducing the iron will depend on the percentage of iron in the slag, a matter which can be readily arrived at by suitable tests. The quantity of fluxing material added in the reducing stages of the process will likewise depend on the percentage of iron, suffice it to say however that enough lime or its equivalent should be added to take up the silica released by the iron.

The instrumentalities by which the process can be carried on may be varied, and in the majority of cases may be very simple. For example, we may employ an ordinary slag pot mounted on trunnions into which the slag from the copper smelting furnace is tapped, equipping the pot with an air pipe entering the bottom of the pot. Into this pipe a certain quantity of powdered fuel is introduced, said fuel being carried along by the air forced through the pipe, the mixture of air and fuel rising up through the molten mass, certain portions of the coal being burned and other portions reducing the iron when the proper conditions of temperature and fluidity have been attained, it being understood of course that at the reducing stage proper, a proper complement of lime or its equivalent is either introduced into the air pipe to be blown into the bath in conjunction with the fuel, or charged independently into the pot to take up the silica. The above apparatus will serve as an example; other forms may be readily devised by the skilled metallurgist. The air introduced into the molten slag may of course be at normal temperature or a hot blast may be utilized. In this regard I am not to be restricted. Neither am I to be restricted to the precise character of fuel or heating and reducing agent employed, it being sufficient to state that the fuel should be preferably carbonaceous and in fluent form, not excluding liquid and gaseous fuel. The reagents should of course be introduced into the body or mass of the molten slag below the surface thereof so as to permeate every portion of the bath and insure a complete chemical reaction between the slag and said reagents. Obviously, the process is not to be restricted in its application to what are technically termed "slags" but may be employed for treating any equivalent material or silicates from which the metal component can be extracted.

Having described my invention what I claim is:

1. In the treatment of slags carrying iron, the process which consists in subjecting a charge of molten slag to the action of a blast of a supporter of combustion, and a reducing agent in a finely divided state permeating said charge, and continuing the operation with a sufficient excess of reducing agent to reduce the iron of the slag.

2. In the treatment of slags carrying iron, the process which consists in subjecting a charge of molten slag to the action of a blast of air directed into the body of the charge below the surface thereof, and a carbonaceous reducing agent in a finely divided state permeating said charge, and continuing the operation with a sufficient excess of reducing reagent in the presence of a fluxing material added to the charge to take up the silica released by the iron.

3. In the treatment of slags carrying iron, the process which consists in subjecting a charge of molten slag to the action of a blast of air charged with powdered carbonaceous fuel directed into the bath of slag below the surface thereof, continuing the blowing operation with an excess of fuel in the presence of suitable fluxing material permeating the bath, whereby the iron is reduced and a slag free from iron is formed.

4. In the treatment of slags from copper smelting furnaces, the process which consists in subjecting a bath of molten slag in a treatment vessel to the action of a blast of air mixed with powdered coal directed into the mass of the slag below the surface thereof to raise the temperature of the bath, continuing the blowing operation with a sufficient excess of the powdered coal to reduce the iron, and with a suitable complement of lime in a finely divided state to operate as a flux and take up the silica released by the iron, thereby producing metallic iron and a silicate of calcium.

5. In the treatment of slags from copper smelting furnaces, the process which consists in placing a charge of molten slag into a treatment vessel, directing jets of air carrying powdered coal into the body of the slag below the surface thereof to raise the temperature of the bath, continuing the blowing operation with sufficient powdered coal to reduce the iron, and at the same time charging the air stream with a proper complement of lime in a finely divided state to cause the lime to permeate the bath and form a lime slag, and finally removing the iron from the slag.

6. In the treatment of slags carrying iron, the process of subjecting a charge of molten slag to the action of a blast of air directed beneath the surface of the bath, and mixing with the air stream suitable complements of fluent carbonaceous reducing agent to reduce the iron, and calcareous fluxing material to form a lime slag.

7. In the treatment of slags carrying iron, the process of subjecting a charge of molten slag to the action of a blast of air carrying fluent carbonaceous reducing reagent, then continuing the blowing operation with the addition to the air stream of lime in a finely divided state as a fluxing agent, whereby the iron is reduced and a lime slag formed.

8. In the treatment of slags carrying iron, the process which consists in subjecting a charge of molten slag below the surface thereof to the action of a blast of a supporter of combustion, and a fluent reducing agent permeating said charge, and continuing the operation with a sufficient excess of reducing agent to reduce the iron of the slag.

In testimony whereof I affix my signature, in presence of two witnesses.

ULYSSES A. GARRED.

Witnesses:
HENRY PAUL,
G. U. MUNSON.